(12) United States Patent
Omi

(10) Patent No.: US 7,750,617 B2
(45) Date of Patent: Jul. 6, 2010

(54) SWITCHING REGULATOR AND ELECTRONIC DEVICE THEREWITH

(75) Inventor: Masaki Omi, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 250 days.

(21) Appl. No.: 11/910,474

(22) PCT Filed: Apr. 18, 2006

(86) PCT No.: PCT/JP2006/308104

§ 371 (c)(1),
(2), (4) Date: Oct. 2, 2007

(87) PCT Pub. No.: WO2006/118021

PCT Pub. Date: Nov. 9, 2006

(65) Prior Publication Data

US 2009/0268492 A1    Oct. 29, 2009

(30) Foreign Application Priority Data

Apr. 26, 2005    (JP) .............................. 2005-127774

(51) Int. Cl.
*G05F 1/575*    (2006.01)
(52) U.S. Cl. ..................... 323/285; 323/288
(58) Field of Classification Search ................ 323/222, 323/223, 282, 284, 285, 288
See application file for complete search history.

(56) References Cited

U.S. PATENT DOCUMENTS

| 4,837,495 | A | * | 6/1989 | Zansky | ........................ 323/222 |
| 4,975,820 | A | * | 12/1990 | Szepesi | .................... 363/21.17 |
| 5,615,098 | A | | 3/1997 | Ishii et al. | |
| 6,958,595 | B2 | | 10/2005 | Niiyama et al. | |
| 7,126,314 | B2 | * | 10/2006 | McGinty et al. | ............. 323/222 |

FOREIGN PATENT DOCUMENTS

| EP | 0669703 A2 | 8/1995 |
| JP | 07-222448 | 8/1995 |
| JP | 11-313479 | 11/1999 |
| JP | 2000-092833 | 3/2000 |
| JP | 2005-033862 | 2/2005 |

* cited by examiner

Primary Examiner—Gary L Laxton
(74) Attorney, Agent, or Firm—Fish & Richardson P.C.

(57) ABSTRACT

A switching regulator (20) includes a sense resistor (Rs), a sense current generating circuit (213) for generating a sense current (Isense) commensurate with a sense voltage (Vsense), a slope current generating circuit (214) for generating a slope current (Islope) with a ramped or triangular waveform, a slope voltage generating circuit (215) for generating a slope voltage (Vslope) commensurate with a summed current (Isense plus Islope), an error amplifier (ERR) for generating an error voltage (Verr) commensurate with an error of an output, a comparator (CMP) for comparing the error voltage (Verr) with the slope voltage (Vslope) to generate a PWM signal and a switching control section (CTRL) for turning on and off an output transistor (N1) based on the PWM signal.

19 Claims, 3 Drawing Sheets

SWITCHING REGULATOR AND ELECTRONIC DEVICE THEREWITH

TECHNICAL FIELD

The present invention relates to a switching regulator for producing a desired output voltage from an input voltage, and also relates to an electronic device incorporating such a switching regulator. More particularly, the invention relates to power supply apparatuses in general (such as those for use in liquid crystal display monitors, and in large liquid-crystal-display televisions and as on-board power supplies) that are required to respond quickly to load fluctuations.

BACKGROUND ART

Conventionally, as means for supplying stabilized electric power with low thermal loss and in addition with comparatively high efficiency in cases where input-output differences are large, there have been widely used switching regulators (chopper regulators) that produce a desired output voltage from an input voltage by driving one end of an energy storage element (such as a capacitor or inductor) through the turning on and off of an output transistor (i.e., through the control of the on-duty thereof).

In conventional switching regulators, as shown in FIG. 3, an error amplifier ERR is provided for amplifying the difference between a feedback voltage Vfb varying according to the output voltage and a predetermined reference voltage Vref, and the output transistor N1 is driven according to an error voltage Verr produced by the error amplifier ERR.

In addition, in switching regulators required to respond quickly to load fluctuations, as shown in FIG. 3, the switch current Isw flowing through the output transistor N1 is detected, in the form of a sense voltage Vsense, with a sense resistor Rs, and the output transistor N1 is driven also according to the sense voltage Vsense (by so-called current mode control; for example, see patent document 1 below).

Patent document 1: JP-A-2000-92833.

DISCLOSURE OF THE INVENTION

Problems to be Solved by the Invention

To be sure, the conventional switching regulators described above can directly drive, even if the output of the error amplifier ERR fails to follow load fluctuations, the output transistor N1 according to the result of the detection of the switch current Isw, thus producing a stabilized output voltage with little voltage variation.

In the conventional switching regulators descried above, however, since current mode control is achieved by directly referring to the minute sense voltage Vsense of about several tens of milliohms across the sense resistor Rs, current mode control is susceptible to noise, and thus, inconveniently, poor output accuracy may result when the switching regulators are used in harsh noise environments (for example, when incorporated in mobile telephones).

Incidentally, in the configuration shown in FIG. 3, where the sense resistor Rs is connected in series with the output transistor N1, the resistance of the sense resistor Rs can be increased to raise the level of the sense voltage Vsense; this does help improve the S/N ratio thereof, but inconveniently lowers the conversion efficiency of the switching regulator.

An object of the present invention is to provide a switching regulator that achieves improved output accuracy in noisy environments without loss of conversion efficiency, and also to provide an electronic device incorporating such a switching regulator.

Means for Solving the Problem

To achieve the above object, according to one aspect of the present invention, a switching regulator that generates a PWM signal by comparing an error voltage commensurate with an error of an output voltage from a target value thereof with a slope voltage for PWM control, then turns on and off an output transistor based on the PWM signal to drive one end of an energy storage element, and thereby produces a desired output voltage from an input voltage includes a sense current generating means for generating a sense current commensurate with a switch current flowing through the output transistor, so that the voltage level of the slope voltage is offset according to the sense current (a first configuration).

More specifically, according to another aspect of the invention, a switching regulator that turns on and off an output transistor to drive one end of an energy storage element and thereby produces a desired output voltage from an input voltage includes: a sense resistor for generating a sense voltage commensurate with a switch current flowing through the output transistor; a sense current generating means for generating a sense current commensurate with the sense voltage; a slope current generating means for generating a slope current with a ramped or triangular waveform; a slope voltage generating means for generating a slope voltage commensurate with a summed current of the sense current and the slope current; an error voltage generating means for generating an error voltage by amplifying a difference between a feedback voltage commensurate with the output voltage and a predetermined target set voltage; a PWM signal generating means for comparing the error voltage with the slope voltage to generate a PWM signal; and a switching control means for turning on and off the output transistor based on the PWM signal (a second configuration).

With this configuration, it is possible to eventually raise, while keeping the resistance of the sense resistor low, the voltage level of the slope voltage to a desired voltage level. Thus, current mode control is achieved that is little affected by noise and is free from loss of conversion efficiency. This leads to improved output accuracy in noisy environments. Moreover, since no monitor transistor is used, erroneous detection resulting from poor correspondence is prevented. This helps achieve current mode control superior in characteristics of supply voltage and temperature.

The switching regulator of the second configuration may further include an inductor serving as the energy storage element, a rectifier element for rectifying or switching an output current and a smoothing capacitor for smoothing the output voltage (a third configuration).

In the switching regulator of any one of the second and third configurations, the sense current generating means may include: a first resistor through which a current commensurate with the sense voltage is passed; and a first current mirror circuit for generating the sense current by mirroring the current flowing through the first resistor, the slope current generating means may include: an oscillating circuit for generating an oscillating voltage with a ramped or triangular waveform; a second resistor through which a current commensurate with the oscillating voltage is passed; and a second current mirror circuit for generating the slope current by mirroring the current flowing through the second resistor, and the slope voltage generating means may include: a third resistor through which a summed current of the sense current and the slope current is passed, the slope voltage being extracted from one end of the third resistor (a fourth configuration). With this configuration, it is possible to eventually raise, while keeping the resistance of the sense resistor low, the voltage level of the slope voltage to a desired voltage level by increasing the resistance of the third resistor. It is also possible to easily adjust the magnitudes of the sense current and the slope current relative to each other by appropriately setting the resistances of the first and second resistors.

In the switching regulator of the fourth configuration, the resistance of the sense resistor varies at its predetermined thermal coefficient, and the resistance of at least one of the first to third resistors may be set to vary at such a thermal coefficient as to compensate for the predetermined thermal coefficient (a fifth configuration). With this configuration, it is possible to achieve output feedback control with high accuracy irrespective of temperature variations.

According to yet another aspect of the invention, an electronic device includes, as means for converting the output of a power supply, the switching regulator of any one of the first to fifth configurations. The power supply may be formed as a battery. With this configuration, it is possible to stably provide the supply of electric power even in noisy environments without wasting of the battery power. In particular, when a switching regulator according to the invention is used for supplying electric power to a data signal generating section in a liquid crystal panel, a voltage for writing data to a pixel transistor is less likely to vary. This helps prevent liquid crystal from being insufficiently driven, and helps ensure the writing of data to display memory or the like. Thus, it is possible to achieve superior image display that is less likely to encounter disadvantages such as low contrast or uneven brightness.

Advantages of the Invention

As described above, the switching regulator of the invention achieves improved output accuracy in noisy environments without loss of conversion efficiency. This leads to reduced power consumption and improved reliability of an electronic device incorporating such a switching regulator.

LIST OF REFERENCE SYMBOLS

| 10 | Battery |
|---|---|
| 20 | DC/DC converter (switching regulator) |
| 30 | TFT liquid crystal panel |
| 21 | Switching power supply IC |
| 211 | Switch drive circuit |
| 212 | Sense voltage generating circuit |
| 213 | Sense current generating circuit |
| 214 | Slope current generating circuit |
| 215 | Slope voltage generating circuit |
| 216 | Output feedback circuit |
| CTRL | Switching control section |
| N1 to N6 | N-channel field effect transistor |
| P1 to P6 | P-channel filed effect transistor |
| Rs | Sense resistor |
| R1 to R3 | Resistor |
| I1 to I2 | Constant current source |
| I3 | Variable current source |
| C1 | Capacitor |
| ERR | Error amplifier |
| E1 | Direct current voltage source |
| CMP | Comparator |
| T1 to T2 | External terminal |
| Lex | Inductor (externally connected) |
| Dex | Rectifier diode (externally connected) |
| Cex | Smoothing capacitor |
| Rex1 to Rex2 | Resistor (externally connected) |

BEST MODE FOR CARRYING OUT THE INVENTION

Hereinafter, the present invention will be described by way of an example where it is applied to a DC/DC converter that is incorporated in a mobile telephone for the purpose of converting the output voltage of a battery into a drive voltage with which to drive the relevant components of the mobile telephone (for example, a TFT (thin film transistor) liquid crystal panel).

Figure 1:
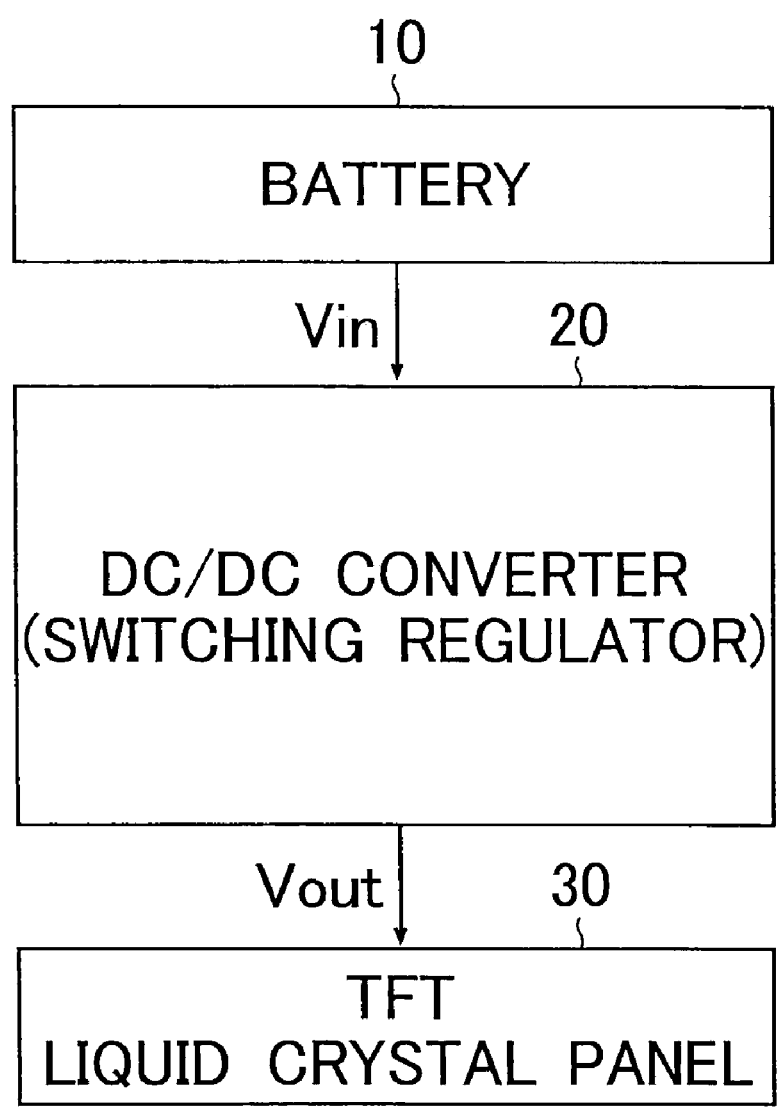
[FIG. 1] A block diagram showing a mobile telephone as an embodiment of the invention.

FIG. 1 is a block diagram showing a mobile telephone as an embodiment of the invention (showing, in particular, the part thereof concerned with the supply of electric power to a TFT liquid crystal panel). As shown in FIG. 1, the mobile telephone of this embodiment includes: a battery 10 serving as a power supply for the entire mobile telephone; a DC/DC converter 20 serving as means for converting the output of the battery 10; and a TFT liquid crystal panel 30 serving as the display means of the mobile telephone. Needless to say, in addition to these components, the mobile telephone of the embodiment includes, as means for achieving the essential capabilities thereof (such as communication capabilities), a transmission/reception circuit, a speaker, a microphone, a display, an operating section, a memory and other components, although they are not illustrated in FIG. 1.

The DC/DC converter 20 produces a constant output voltage Vout from an input voltage Vin supplied from the battery 10, and feeds the output voltage Vout to the TFT liquid crystal panel 30. When the supply of electric power to a data signal generating section (unillustrated) for generating data signals (voltage signals applied to the source lines of pixel transistors) for the TFT liquid crystal panel 30 is unstable, the liquid crystal may be insufficiently driven or the writing of data to display memory or the like may become impossible. This may lead to degraded image quality such as low contrast or uneven brightness. Hence, the DC/DC converter 20 is required to respond quickly to load fluctuations.

Figure 2:
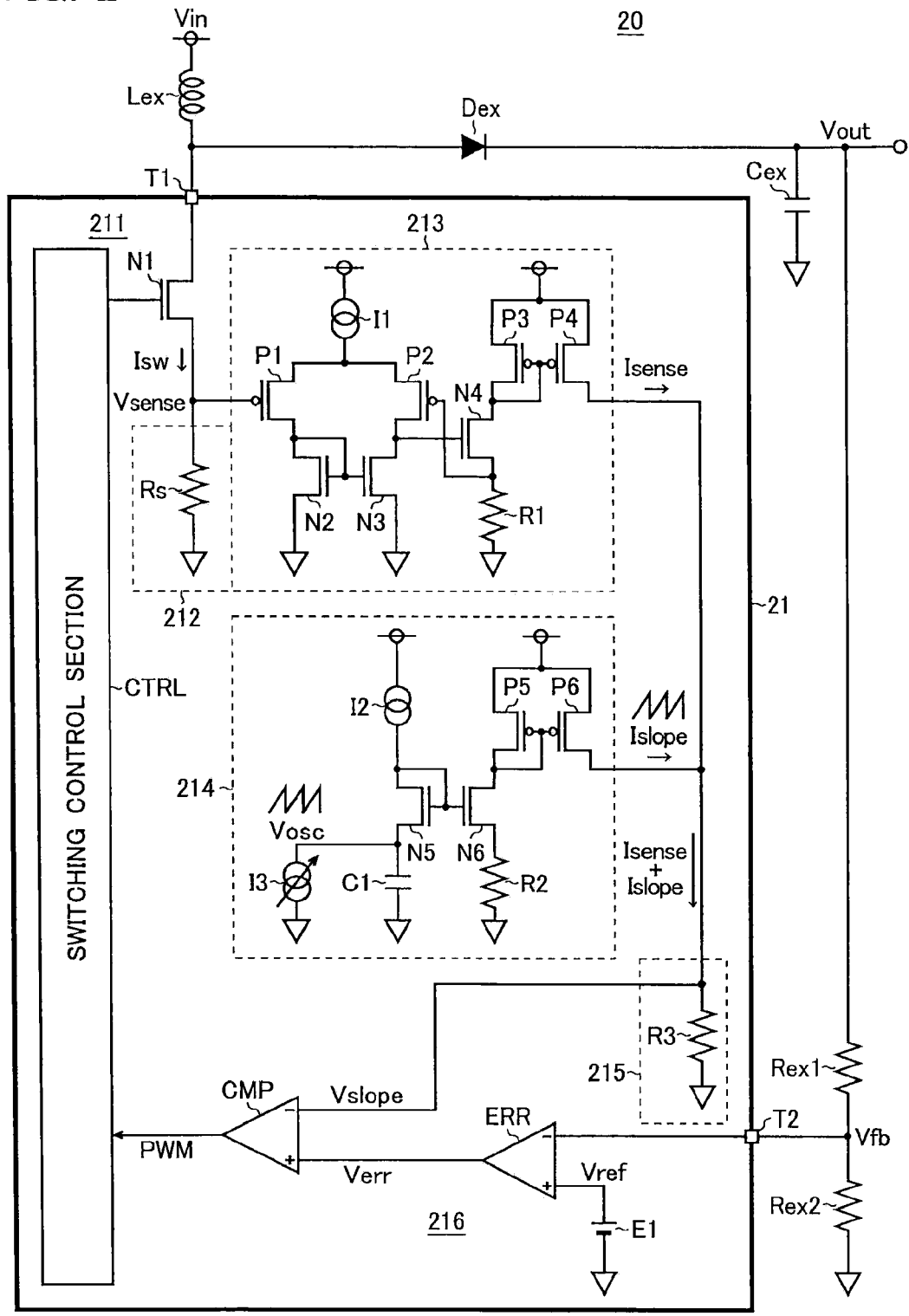
[FIG. 2] A circuit diagram showing an example of the configuration of a DC/DC converter 20.
Figure 3:
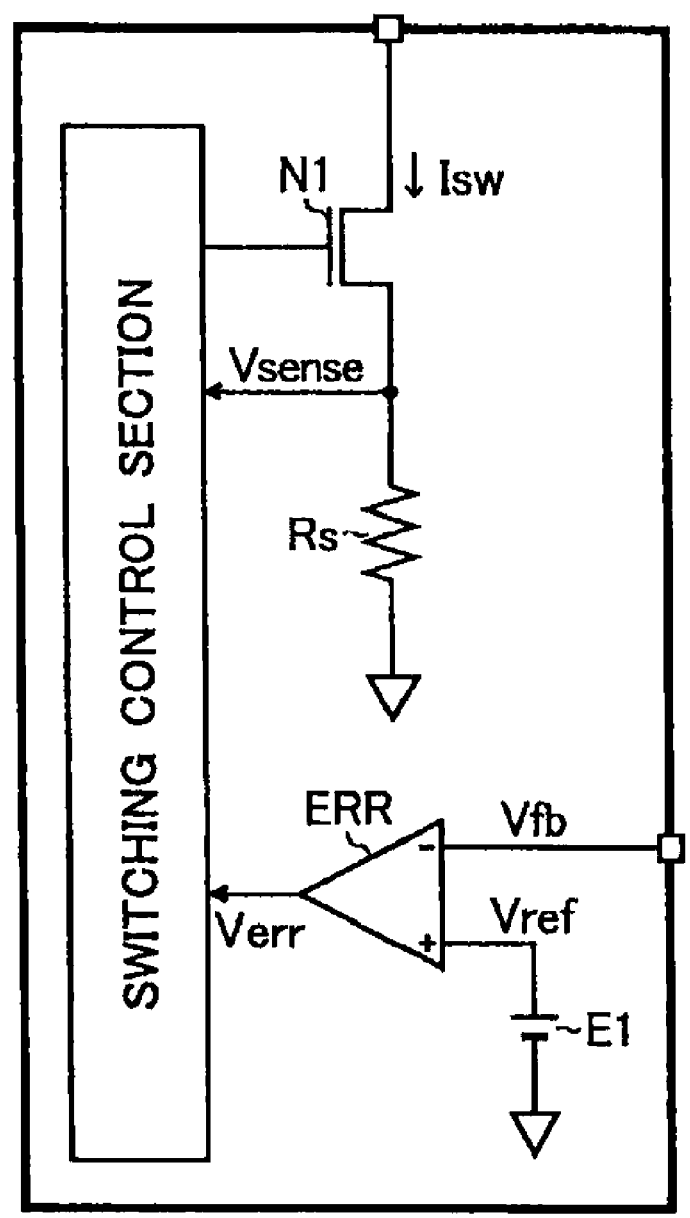
[FIG. 3] A circuit diagram showing an example of a conventional switching regulator adopting current mode control.

FIG. 2 is a circuit diagram (partly a block diagram) showing an example of the configuration of the DC/DC converter 20. As shown in FIG. 2, the DC/DC converter 20 of this embodiment is a step-up switching regulator (chopper regulator) that includes a switching power supply IC 21, and in addition includes, as components externally connected thereto, an inductor Lex, a rectifier diode Dex (such as a Schottky barrier diode), a smoothing capacitor Cex and resistors Rex 1 and Rex 2.

The switching power supply IC 21 includes, in terms of circuit blocks, a switch drive circuit 211, a sense voltage generating circuit 212, a sense current generating circuit 213, a slope current generating circuit 214, a slope voltage generating circuit 215 and an output feedback circuit 216, and also includes external terminals T1 and T2 as means for achieving electrical connection with the outside. In addition to the circuit blocks mentioned above, the switching power supply IC 21 may incorporate a protection circuit block (such as a low-input malfunction preventing circuit or a thermal protection circuit) as required.

The switch drive circuit 211 includes a switching control section CTRL and an N-channel field effect transistor N1. The sense voltage generating circuit 212 includes a sense resistor Rs. The sense current generating circuit 213 includes N-channel field effect transistors N2 to N4, P-channel field effect transistors P1 to P4, a constant current source I1 and a resistor R1. The slope current generating circuit 214 includes N-channel field effect transistors N5 and N6, P-channel field effect transistors P5 and P6, a constant current source I2, a variable current source I3, a capacitor C1 and a resistor R2. The slope voltage generating circuit 215 includes a resistor R3. The output feedback circuit 216 includes an error amplifier ERR, a direct current voltage source E1 and a comparator CMP.

The electrical interconnections between the components mentioned above will be further described below.

The drain of the transistor N1 is connected to the external terminal T1 (a switch terminal). The source of the transistor N1 is connected via the sense resistor Rs to ground. The gate of the transistor N1 is connected to the control signal output terminal of the switching control section CTRL.

The gate of the transistor P1 is connected to the node between the source of the transistor N1 and one end of the sense resistor Rs. The sources of the transistors P1 and P2 are both connected via the constant current source I1 to a power line (to which a voltage of Vin volts is applied, which is assumed to apply throughout the following description). The drain of the transistor P1 is connected to the drain of the transistor N2; the drain of the transistor P2 is connected to the drain of the transistor N3. The gates of the transistors N2 and N3 are connected together, and their node is connected to the drain of the transistor N2. The sources of the transistors N2 and N3 are both connected to ground. The gate of the transistor P2 is connected via the resistor R1 to ground, and is also connected to the source of the transistor N4. The gate of the transistor N4 is connected to the node between the drains of the transistors P2 and N3. The drain of the transistor N4 is connected to the drain of the transistor P3. The gates of the transistors P3 and P4 are connected together, and their node is connected to the drain of the transistor P3. The sources of the transistors P3 and P4 are both connected to the power line. The drain of the transistor P4 is connected via the resistor R3 to ground.

The drain of the transistor N5 is connected via the constant current source I2 to the power line. The source of the transistor N5 is connected via the variable current source I3 to ground, and is also connected via the capacitor C1 to ground. The gates of the transistors N5 and N6 are connected together, and their node is connected to the drain of the transistor N5. The drain of the transistor N6 is connected to the drain of the transistor P5. The source of the transistor N6 is connected via the resistor R2 to ground. The gates of the transistors P5 and P6 are connected together, and their node is connected to the drain of the transistor P5. The sources of the transistors P5 and P6 are both connected to the power line. The drain of the transistor P6 is connected via the resistor R3 to ground.

The inverting input terminal (−) of the error amplifier ERR is connected to the external terminal T2 (an output feedback terminal). The non-inverting input terminal (+) of the error amplifier ERR is connected to the positive terminal of the direct current voltage source E1. The negative terminal of the direct current voltage source E1 is connected to ground. The non-inverting input terminal (+) of the comparator CMP is connected to the output terminal of the error amplifier ERR. The inverting input terminal (−) of the comparator CMP is connected to the node at which the drains of the transistors P4 and P6 and one end of the resistor R3 are connected together. The output terminal of the comparator CMP is connected to the PWM signal input terminal of the switching control section CTRL.

Outside the switching power supply IC 21, the external terminal T1 is connected to one end of the inductor Lex, and is also connected to the anode of the rectifier diode Dex. The other end of the inductor Lex is connected to a terminal for receiving the input voltage Vin fed from the battery 10. The cathode of the rectifier diode Dex is connected via the smoothing capacitor Cex to ground, and is also connected via the resistors Rex1 and Rex 2 to ground. The cathode of the rectifier diode Dex is connected, as well, to a terminal (a power input terminal of the TFT liquid crystal panel 30 serving as a load) for providing the output voltage Vout.

First, a description will be given of the basic operation (DC/DC conversion) of the switching power supply IC 21 configured as described above.

The transistor N1 is an output transistor that is turned on and off by the switching control section CTRL. When the transistor N1 is turned on, a switch current Isw flowing through the transistor N1 to ground passes through the inductor Lex, and thus the inductor Lex stores electrical energy. During the on-period of the transistor N1, if the smoothing capacitor Cex has already stored electrical charge, a current from the smoothing capacitor Cex flows to the load (the TFT liquid crystal panel 30 unillustrated in FIG. 2). Here, since the potential at the external terminal T1 has already dropped to approximately the ground potential through the transistor N1, the rectifier diode Dex is reverse-biased. Thus, no current flows from the smoothing capacitor Cex to the transistor N1.

By contrast, when the transistor N1 is turned off, the electrical energy stored in the inductor Lex is released by the counter electromotive voltage generated in the inductor Lex. Here, the rectifier diode Dex is forward-biased, and hence the current flowing through the rectifier diode Dex passes into the load and also passes through the smoothing capacitor Cex into ground, thus charging the smoothing capacitor Cex. As these operations are repeated, a direct current output smoothed by the smoothing capacitor Cex is fed to the TFT liquid crystal panel 30 serving as the load.

As described above, the switching power supply IC 21 of this embodiment serves as a component of a chopper step-up circuit that steps up an input voltage Vin to produce a desired output voltage Vout by driving one end of an inductor Lex serving as an energy storage element through the turning on and off of a transistor N1.

Next, a description will be given of how the switching power supply IC 21 configured as described above performs voltage feedback control and current mode control.

In the sense voltage generating circuit 212, the switch current Isw flowing through the transistor N1 is directly passed through the sense resistor Rs to extract a sense voltage Vsense from one end of the sense resistor Rs.

In the sense current generating circuit 213, as the drain current of the transistor N2 varies according to the sense voltage Vsense applied to the gate of the transistor P1 from the end of the sense resistor Rs, the drain current of the transistor N3 varies accordingly, thus allowing the transistor N4 to turn on and off. Consequently, a current commensurate with the sense voltage Vsense flows through the resistor R1, and a current mirror circuit composed of the transistors P3 and P4 mirrors the current flowing through the resistor R1 to generate a sense current Isense.

In the slope current generating circuit 214, the variable current source I3 is turned on and off at predetermined time intervals to repeatedly charge and discharge the capacitor C1, thus generating a ramped (sawtooth-shaped) oscillating voltage Vosc. Consequently, a current commensurate with the oscillating voltage Vosc flows through the resistor R2, and a current mirror circuit composed of the transistors P5 and P6 mirrors the current flowing through the resistor R2 to generate a slope current Islope. The slope current Islope may instead be a current signal with a triangular waveform.

In the slope voltage generating circuit 215, the summed current (Isense plus Islope) of the sense current Isense and the slope current Islope is passed through the resistor R3 to extract a slope voltage Vslope from one end of the resistor R3.

With the configuration described above, the voltage level of the slope voltage Vslope is given by the following equation (1):

$$Vslope = R3 \times (Isense + Islope) \qquad (1)$$
$$= R3 \times \left(\frac{Isw \cdot Rs}{R1} + \frac{Vosc}{R2}\right)$$

As will be understood from the above equation (1), the higher the sense current Isense (therefore, the higher the switch current Isw), the more the voltage level of the slope voltage signal Vslope shifts to the higher side.

With the DC/DC converter 20 of this embodiment, as will be understood from the above equation (1), it is possible to increase the resistance of the resistor R3 while keeping the resistance of the sense resistor Rs low in order to eventually raise the voltage level of the slope voltage Vslope to a desired voltage level. Thus, current mode control is achieved that is little affected by noise and is free from loss of conversion efficiency. This leads to improved output accuracy in noisy environments.

The magnitudes of the sense current Isense and the slope current Islope are appropriately adjusted relative to each other according to the specifications of the DC/DC converter 20 (e.g., the inductance of the inductor Lex). With the DC/DC converter 20 of the embodiment, this adjustment can be made easily by appropriately setting the resistances of the resistors Rex1 and Rex 2.

In the output feedback circuit 216, the error amplifier ERR amplifies the difference between the output feedback voltage Vfb (corresponding to the actual value of the output voltage Vout) fed from the node between the externally connected resistors Rex 1 and Rex 2 and a reference voltage Vref (corresponding to the target value Vtarget of the output voltage Vout) produced by the direct current voltage source E1 in order to generate the error voltage Verr. Hence, the voltage level of the error voltage Verr increases as the output voltage Vout decreases below the target value Vtarget.

The comparator CMP is a PWM comparator for comparing the error voltage Verr with the slope voltage Vslope to generate a PWM (pulse width modulation) signal. Thus, the on-duty (the ratio of the on-period of the transistor N1 per unit period) of the PWM signal constantly varies according to the magnitudes of the error voltage Verr and the slope voltage Vslope relative to each other. Specifically, as the output voltage Vout decreases below the target value Vtarget, the on-duty of the PWM signal increases, and as the output voltage Vout approaches the target value Vtarget, the on-duty of the PWM signal decreases. Moreover, as the switch current Isw increases, the on-duty of the PWM signal decreases.

When the switching control section CTRL steps up the input voltage Vin to produce the output voltage Vout, it controls the switching of the transistor N1 based on the PWM signal described above. More specifically, the switching control section CTRL keeps the transistor N1 on during the on-period of the PWM signal; it keeps the transistor N1 off during the off-period of the PWM signal.

As described above, the switching power supply IC 21 of this embodiment can keep the output voltage Vout at the target value Vtarget by voltage feedback control based on the error voltage Verr; it can also respond more rapidly to fluctuations in its input and output and in its load by current mode control based on the switch current Isw.

In the DC/DC converter 20 configured as described above, the resistance of the sense resistor Rs varies at a predetermined thermal coefficient, and the resistance of at least one of the resistors R1 to R3 is set to vary at such a thermal coefficient as to compensate for that predetermined thermal coefficient. This will be described in more detail below.

The sense resistor Rs is formed as one exploiting an aluminum conductor to obtain a tiny resistance of several tens of milliohms, and its resistance varies at a positive thermal coefficient (about 4 000 ppm/degree C.). Here, the abbreviation "ppm" included in the unit of the temperature coefficient stands for "parts per million", and indicates one-millionth. Hence, an increase of one degree C. in temperature causes the resistance of the sense resistor Rs having a positive thermal coefficient of 4 000 ppm/degree C. to increase by four thousand millionths, that is, by 0.4%.

To compensate for the positive thermal coefficient of the sense resistor Rs, the resistor R1 is formed as a base resistor (a semiconductor resistor) whose resistance varies at a positive thermal coefficient (about 3 000 ppm/degree C.) like that of the sense resistor Rs. From the viewpoint of reducing power consumption, the resistor R1 needs to have a resistance of at least several hundred ohms so as not to allow an excessive current to pass therethrough. Thus, the resistor R1 cannot be formed as an aluminum resistor, which is highly conductive, and is instead formed as a single resistor as described just above. This leaves a difference of about 1 000 ppm/degree C. in thermal coefficient between the sense resistor Rs and the resistor R1.

Hence, the resistor R3 needs to be formed as a resistive element whose resistance varies at such a positive thermal coefficient (about 1 000 ppm/degree C.) as to compensate for the above-mentioned difference in thermal coefficient. The resistor R3 also needs to be a resistive element that has a resistance of several tens of kilohms so as to allow the voltage level of the slope voltage Vslope to be raised to a desired level.

In this embodiment, therefore, the resistor R3 is not formed as a single base resistor or a single polysilicon resistor (polycrystalline silicon resistor), but is formed as a combination of a base resistor having a positive thermal coefficient (about 3 000 ppm/degree C.) and a polysilicon resistor having a negative thermal coefficient (about −2 000 ppm/degree C.) connected in series together.

As a result of the resistive elements being formed as described above, output feedback control can be performed with high accuracy even if the chip temperature of the switching power supply IC 21 varies.

Although the above description focuses on the sense current generating circuit 213, and does not specifically mention how the resistor R2 included in the slope current generating circuit 214 is formed, the resistor R2 is formed as a resistive element that is appropriately chosen with consideration given to factors similar to those mentioned above.

To adjust the overall thermal coefficient of the resistances, the ratio between the positive and negative thermal coefficients of the resistive elements constituting the resistor R3 may be varied.

Although the embodiment described above deals with an example where the present invention is applied to a DC/DC converter that is incorporated in a mobile telephone to serve as means for converting the output of a battery, application of the invention is not limited to such DC/DC converters. The invention finds wide application in DC/DC converters incorporated in other electronic devices.

Although the embodiment described above deals with an example where the invention is applied to a step-up DC/DC converter, application of the invention is not limited to such step-up DC/DC converters. The invention can be equally applied to step-down DC/DC converters and step-up/down DC/DC converters.

Otherwise than specifically described by way of an embodiment above, many modifications and variations are possible without departing from the sprit of the invention. For example, a synchronous rectifier, instead of the externally connected rectifier diode, may be included in the switching power supply IC, and the output transistor may be formed as a bipolar transistor.

INDUSTRIAL APPLICABILITY

The present invention is useful in improving the output accuracy of a switching regulator adopting current mode control, and is particularly suitable for a power supply in an electronic device (such as a mobile telephone) that is required to offer high conversion efficiency, whose power output is required to respond quickly to load fluctuations, and that is supposed to be used in harsh noise environments.

What is claimed is:

1. A switching regulator operable to turn on and off an output transistor to drive one end of an energy storage element and thereby produce a desired output voltage from an input voltage, the switching regulator comprising:
   a sense resistor for generating a sense voltage commensurate with a switch current flowing through the output transistor;
   a sense current generating section for generating a sense current commensurate with the sense voltage;
   a slope current generating section for generating a slope current with a ramped or triangular waveform;
   a slope voltage generating section for generating a slope voltage commensurate with a summed current of the sense current and the slope current;
   an error voltage generating section for generating an error voltage by amplifying a difference between a feedback voltage commensurate with the output voltage and a predetermined target set voltage;
   a PWM signal generating section for comparing the error voltage with the slope voltage to generate a PWM signal; and
   a switching control section for turning on and off the output transistor based on the PWM signal,
   wherein the sense current generating section comprises:
      a first resistor through which a current commensurate with the sense voltage is passed; and
      a first current mirror circuit for generating the sense current by mirroring the current flowing through the first resistor.

2. The switching regulator of claim 1, further comprising:
   an inductor operable to serve as the energy storage element;
   a rectifier element for rectifying or switching an output current; and
   a smoothing capacitor for smoothing the output voltage.

3. The switching regulator of claim 1,
   wherein the slope current generating section comprises:
      an oscillating circuit for generating an oscillating voltage with a ramped or triangular waveform;
      a second resistor through which a current commensurate with the oscillating voltage is passed; and
      a second current mirror circuit for generating the slope current by mirroring the current flowing through the second resistor.

4. The switching regulator of clam 3, wherein a resistance of the sense resistor varies at a predetermined thermal coefficient, and a resistance of at least one of the first or second resistors is set to vary at such a thermal coefficient as to compensate for the predetermined thermal coefficient.

5. An electronic device including a switching regulator to convert an output of a power supply, the switching regulator operable to turn on and off an output transistor to drive one end of an energy storage element; and thereby produce a desired output voltage from an input voltage,
   wherein the switching regulator comprises:
      a sense resistor for generating a sense voltage commensurate with a switch current flowing through the output transistor;
      a sense current generating section for generating a sense current commensurate with the sense voltage;
      a slope current generating section for generating a slope current with a ramped or triangular waveform;
      a slope voltage generating section for generating a slope voltage commensurate with a summed current of the sense current and slope current;
      an error voltage generating section for generating an error voltage by amplifying a difference between a feedback voltage commensurate with the output voltage and a predetermined target set voltage;
      a PWM signal generating section for comparing the error voltage with the slope voltage to generate a PWM signal; and
      a switching control section for turning on and off the output transistor based on the PWM signal,
   wherein the sense current generating section comprises:
      a first resistor through which a current commensurate with the sense voltage is passed; and
      a first current mirror circuit for generating the sense current by mirroring the current flowing through the first resistor.

6. The electronic device of claim 5, wherein the power supply is a battery.

7. A switching regulator that turns on and off an output transistor to drive one end of an energy storage element and thereby produces a desired output voltage from an input voltage, the switching regulator comprising:
   a sense resistor for generating a sense voltage commensurate with a switch current flowing through the output transistor;
   a sense current generating section for generating a sense current commensurate with the sense voltage;
   a slope current generating section for generating a slope current with a ramped or triangular waveform;
   a slope voltage generating section for generating a slope voltage commensurate with a summed current of the sense current and the slope current;

an error voltage generating section for generating an error voltage by amplifying a difference between a feedback voltage commensurate with the output voltage and a predetermined target set voltage;

a PWM signal generating section for comparing the error voltage with the slope voltage to generate a PWM signal; and a switching control section for turning on and off the output transistor based on the PWM signal, wherein the slope current generating section comprises:
an oscillating circuit for generating an oscillating voltage with a ramped or triangular waveform;
a second resistor through which a current commensurate with the oscillating voltage is passed; and
a current mirror circuit for generating the slope current by mirroring the current flowing through the second resistor.

8. The switching regulator of claim 7 further comprising:
an inductor serving as the energy storage element;
a rectifier element for rectifying or switching an output current; and
a smoothing capacitor for smoothing the output voltage.

9. The switching regulator of claim 7 wherein the slope voltage generating section comprises a third resistor through which a summed current of the sense current and the slope current is passed, the slope voltage being extracted from one end of the third resistor.

10. The switching regulator of clam 9 wherein a resistance of the sense resistor varies at a predetermined thermal coefficient, and a resistance of at least one of the second or third resistors is set to vary at a thermal coefficient so as to compensate for the predetermined thermal coefficient.

11. An electronic device including a switching regulator to convert an output of a power supply, the switching regulator arranged to turn on and off an output transistor to drive one end of an energy storage element and thereby produce a desired output voltage from an input voltage, wherein the switching regulator comprises:
a sense resistor for generating a sense voltage commensurate with a switch current flowing through the output transistor;
a sense current generating section for generating a sense current commensurate with the sense voltage;
a slope current generating section for generating a slope current with a ramped or triangular waveform;
a slope voltage generating section for generating a slope voltage commensurate with a summed current of the sense current and slope current;
an error voltage generating section for generating an error voltage by amplifying a difference between a feedback voltage commensurate with the output voltage and a predetermined target set voltage;
a PWM signal generating section for comparing the error voltage with the slope voltage to generate a PWM signal; and
a switching control section for turning on and off the output transistor based on the PWM signal,
wherein the slope current generating section comprises:
an oscillating circuit for generating an oscillating voltage with a ramped or triangular waveform;
a second resistor through which a current commensurate with the oscillating voltage is passed; and
a current mirror circuit for generating the slope current by mirroring the current flowing through the second resistor.

12. The electronic device of claim 11 wherein the power supply is a battery.

13. A switching regulator arranged to turn on and off an output transistor to drive one end of an energy storage element and thereby produce a desired output voltage from an input voltage, the switching regulator comprising:
a sense resistor for generating a sense voltage commensurate with a switch current flowing through the output transistor;
a sense current generating section for generating a sense current commensurate with the sense voltage;
a slope current generating section for generating a slope current with a ramped or triangular waveform;
a slope voltage generating section for generating a slope voltage commensurate with a summed current of the sense current and the slope current;
an error voltage generating section for generating an error voltage by amplifying a difference between a feedback voltage commensurate with the output voltage and a predetermined target set voltage;
a PWM signal generating section for comparing the error voltage with the slope voltage to generate a PWM signal; and
a switching control section for turning on and off the output transistor based on the PWM signal,
wherein the slope voltage generating section comprises a resistor through which a summed current of the sense current and the slope current is passed, the slope voltage being extracted from one end of the resistor in the slope voltage generating section.

14. The switching regulator of claim 13 further comprising:
an inductor serving as the energy storage element;
a rectifier element for rectifying or switching an output current; and
a smoothing capacitor for smoothing the output voltage.

15. The switching regulator of claim 13 wherein the sense current generating section comprises:
a first resistor through which a current commensurate with the sense voltage is passed; and
a first current mirror circuit for generating the sense current by mirroring the current flowing through the first resistor.

16. The switching regulator of claim 15 wherein the slope current generating section comprises:
an oscillating circuit for generating an oscillating voltage with a ramped or triangular waveform;
a second resistor through which a current commensurate with the oscillating voltage is passed; and
a second current mirror circuit for generating the slope current by mirroring the current flowing through the second resistor.

17. The switching regulator of clam 15 wherein a resistance of the sense resistor varies at a predetermined thermal coefficient, and a resistance of at least one of the first resistor in the sense current generating section or the resistor in the slope voltage generating section is set to vary at a thermal coefficient so as to compensate for the predetermined thermal coefficient.

18. An electronic device including a switching regulator for converting an output of a power supply, the switching regulator arranged to turn on and off an output transistor to drive one end of an energy storage element and thereby producing a desired output voltage from an input voltage, wherein the switching regulator comprises:
a sense resistor for generating a sense voltage commensurate with a switch current flowing through the output transistor;

a sense current generating section for generating a sense current commensurate with the sense voltage;

a slope current generating section for generating a slope current with a ramped or triangular waveform;

a slope voltage generating section for generating a slope voltage commensurate with a summed current of the sense current and slope current;

an error voltage generating section for generating an error voltage by amplifying a difference between a feedback voltage commensurate with the output voltage and a predetermined target set voltage;

a PWM signal generating section for comparing the error voltage with the slope voltage to generate a PWM signal; and a switching control section for turning on and off the output transistor based on the PWM signal, wherein the slope voltage generating section comprises a resistor through which a summed current of the sense current and the slope current is passed, the slope voltage being extracted from one end of the resistor in the slope voltage generating section.

19. The electronic device of claim 18 wherein the power supply is a battery.

* * * * *